United States Patent
Misra et al.

(10) Patent No.: US 6,551,514 B1
(45) Date of Patent: Apr. 22, 2003

(54) CYANIDE DETOXIFICATION PROCESS

(75) Inventors: Manoranjan Misra, Reno, NV (US); Gautam Priyadarshan, Reno, NV (US); Birendra Kumar Jena, North Canton, OH (US)

(73) Assignee: The Board of Regents of the University and Community College System of Nevada, Reno, NV (US)

( * ) Notice: Subject to any disclaimer, the term of this patent is extended or adjusted under 35 U.S.C. 154(b) by 0 days.

(21) Appl. No.: 09/698,521

(22) Filed: Oct. 27, 2000

Related U.S. Application Data

(60) Provisional application No. 60/161,854, filed on Oct. 27, 1999.

(51) Int. Cl.$^7$ .................................................. C02F 9/00
(52) U.S. Cl. ..................... 210/665; 210/667; 210/724; 210/726; 210/904
(58) Field of Search .................................. 210/665, 667, 210/669, 684, 726, 904, 724

(56) References Cited

U.S. PATENT DOCUMENTS

| | | | |
|---|---|---|---|
| 4,530,768 A | 7/1985 | Tanihara et al. | 210/719 |
| 4,537,686 A | 8/1985 | Borbely et al. | 210/713 |
| 4,840,735 A | 6/1989 | Goodwin | 210/721 |
| 5,264,192 A | 11/1993 | Shutt et al. | 423/29 |

*Primary Examiner*—Ivars Cintins
(74) *Attorney, Agent, or Firm*—Greenlee, Winner and Sullivan, P.C.

(57) ABSTRACT

Methods for rendering a cyanide or cyanide-containing compound substantially insoluble in an aqueous solution or suspension of cyanide-containing materials comprising: mixing a reagent comprising a thiosulfate salt with said solution or suspension; and adding to said material a complexing agent selected from the group consisting of divalent copper salts, divalent iron salts, divalent cobalt salts, activated carbon and mixtures of the foregoing are provided.

17 Claims, 3 Drawing Sheets

CYANIDE DETOXIFICATION PROCESS

CROSS-REFERENCE TO RELATED APPLICATIONS

This application takes priority to U.S. Provisional Patent Application Ser. No. 60/161,854, filed Oct. 27, 1999, which is hereby incorporated by reference to the extent not inconsistent with the disclosure herein.

BACKGROUND OF THE INVENTION

The principal method used in the extraction of gold is cyanidation. The basic principle of the cyanidation process is that cyanide solutions have a preferential dissolving action for the precious metals contained in an ore (Marsden J., House I., The Chemistry of Gold Extraction, Chapter 6, published by Ellis Horwood Limited, 1992, page 259–308). The mechanism of cyanidation can be demonstrated by reaction (1) (Tukel, C., Celik, H., Ipekoglu, U., Tanriverdi, M., & Mordogan, H., Leaching of Ovacik gold ore with cyanide and thiourea, *Changing Scopes in Mineral Processing*, 1996, page 567–572).

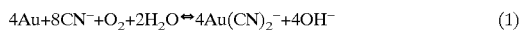

$$4Au + 8CN^- + O_2 + 2H_2O \leftrightarrow 4Au(CN)_2^- + 4OH^- \quad (1)$$

The gold dissolution rate is believed to be dependent on the concentration of NaCN and the alkalinity of the solution. For efficient leaching, the gold should occur as free, fine-size, clean particles in an ore that contains no cyanicides or impurities that might destroy cyanide or otherwise inhibit the dissolution reaction.

The cyanidation process for the extraction of gold from different gold ores has been employed for nearly a century. Cyanide is a powerful lixiviant for gold and silver extraction from ores. But at the same time cyanide forms complexes with other metals, such as mercury, zinc, copper, iron, nickel and lead, which partially account for the consumption of cyanide in gold extraction. Also free cyanide as well as cyanide complexes of heavy metals are discharged to the tailings pond. Because of the toxicity of cyanide it is necessary to detoxify cyanide from the process stream before discharge.

The toxicity of free cyanide and metal cyanide complexes can manifest itself in either an acute or chronic manner. The period of acute toxicity ranges from a few minutes to several days. Although cyanide is not an accumulative toxicant, the metals bound to cyanide can bioconcentrate or bioaccumulate, resulting in permanent physiological damage.

In the western United States, gold operations are generally permitted with zero discharge from the processes. The state of Nevada which has the largest gold extraction operations in the United States, requires that operations not degrade the quality of the groundwater of the state. United States, requires that operations not degrade the quality of the groundwater of the state. Nevada sets the surface water quality at concentrations equal to state and federal drinking water standards with cyanide concentrations not to exceed 0.2 milligrams weak and dissociable (WAD) cyanide per liter. (Smith A. and Mudder T., The Chemistry and Treatment of Cyanidation Wastes, *Mining Journal Books Limited*, London, 1991; Bucknam C. H., Cyanide Solution Detoxification Jar Tests, *The Minerals Metals & Materials Society*, 1997, page 191–204).

In addition to the mining industries, cyanide wastes are also produced by the electroplating, chemical, petrochemical, metallurgical processing and tin production industries, for example. The toxicity of cyanide in wastewaters is related to its form and concentration. The chemistry of cyanide is complex and many forms of cyanide exist in mining solutions (Smith A. and Mudder T., The Chemistry and Treatment of Cyanidation Wastes, *Mining Journal Books Limited*, London, 1991). The major categories of cyanide compounds which are important from a toxicity viewpoint include: free cyanide; iron cyanide; weak acid dissociable (WAD) cyanides; and cyanide related compounds.

Mineral wastes are highly complex because of the chemical interactions occurring in the metallurgical processes, ore geochemistry, leaching reagents, meteorological factors, and site hydrology. The pH of cyanide leached slurries and process solutions are generally in the range of 9–11 and may contain high concentrations (beyond dischargeable limits) of cyanide, heavy metals and species which can form anionic complexes at high pH values viz., As, Mo and Se. Thiocyanate, cyanate and ammonia may also be present at levels of concern (Ritcey, G. M., Tailings Management: Problems and Solution in The Mining Industry. Process Metallurgy 6. *Energy, Mines and Resources* Canada, CANMET. Elsevier, 1989 pp 970).

Acid solutions favor the presence of HCN and at pH values below 7 essentially all of the free cyanide is present in CN$^-$ form. At a pH value of 9.36 (equal to the pK), the concentrations of HCN and CN ion are equal. At lower pH values, and at 20° C., most cyanide exists as molecular HCN: 69.6 percent at pH 9; 95.8 percent at pH 8; and greater than 99 percent at pH 7. It is apparent that most of the "free cyanide"—the sum of molecular hydrogen cyanide and the cyanide ion in natural waters would be in the form of HCN (Marsden J., House I., The Chemistry of Gold Extraction, Chapter 6, published by Ellis Horwood Limited, 1992, page 259–308).

Simple cyanides are represented by the formula $A(CN)_x$, where A is an alkali (sodium, potassium, ammonium) or metal, and x, the valence of A, represents the number of cyano groups present in the molecule (Huiatt, J. L., Kerrigan, J. E., Olson, F. A. and Potter, G. L. (editorial committee) Cyanide from Mineral Processing, *Proceedings of a Workshop*, Salt Lake City, Utah, 1982). Soluble compounds, particularly the alkali cyanides, ionize to release cyanide ions. The solubility is influenced by pH and temperature.

The complex alkali-metallic cyanides can generally be represented by the formula $A_y M(CN)_x$, where A is the alkali, y is the number of alkalies, M is the heavy metal (ferrous or ferric iron, cadmium, copper, nickel, silver, zinc, or others) and x is the number of CN groups. The value of x is equal to the valence of A taken y times, plus the valence of the heavy metal. The soluble complex cyanides release the radical or complex ion $M(CN)_x$ rather than the CN group. The complex ion may then undergo further dissociation releasing cyanide ion. Metal cyanide complex ions may be considered as the soluble products of the reaction between the corresponding insoluble simple cyanide and excess cyanide ion.

In general, the complex ion is more stable than the original compound and thus subsequent dissociation is relatively minor. There are 18 elements that form complex cyanide compounds, and there are more than 64 oxidation states of these metals capable of forming complex cyanides under certain conditions (Smith A. and Mudder T., The Chemistry and Treatment of Cyanidation Wastes, *Mining Journal Books Limited*, London, 1991). Two factors influencing the rate of dissociation at a given temperature are the pH of the medium and the concentration of the complex ion. In general, dissociation rates increase with either decreasing pH or decreasing total cyanide concentration. As expected, the rates of dissociation differ among the complex cyanides.

Not only is the rate of dissociation dependent upon pH and concentration, but the degree of dissociation also depends strongly on pH and concentration, i.e., the production of free cyanide from the dissociation of complex cyanides. At acid pH, the percentages of free cyanides are high and decrease as pH is increased to neutral and alkaline values.

Some of the heavy metals present in tailings solution as a result of mineral dissolution or flotation reagent addition, notably iron, copper, and zinc, can be precipitated from simple salts as their hydroxides and settle within the tailing mass. Soluble cyano complexes of these metals, however, are not readily precipitated as hydroxides and remain in solution. Their removal generally requires more sophisticated treatment than simple hydroxide precipitation.

Table 1 describes the relative stabilities of cyanide complexes (Scott, J. S., An overview of Cyanide Treatment Methods for Gold Mill Effluents, *Cyanide and the Environment Proceedings of a Conference*, Tucson Ariz. 1984; Smith A. and Mudder T., The Chemistry and Treatment of Cyanidation Wastes, *Mining Journal Books Limited*, London, 1991). Total cyanide includes all the species of cyanide present in the solution.

reduce treatment chemical consumption, though it is generally not sufficient by itself (Simovic, L., Snodgrass, W. J., Murphy, K. L. and Schmidt, J. W., Development of a Model to Describe the Natural Degradation of Cyanide in Gold Mill Effluents. *Cyanide and the Environment Proceedings of a Conference*, Tucson Ariz. 1984; Castri, K. F., MeDevitt, D. A. and Castric, P. A. (1981). Influence of Aeration on Hydrogen Cyanide Biosynthesis, *Current Microbiology*, v.5, 1981. pp 223–226)

The process of chemical oxidation, also known as the oxidation process, is of four major types: Alkaline Chlorination; Ozonation; Hydrogen Peroxide or Degussa Process; $SO_2$/Air (INCO) Oxidation.

The process which was initially developed to treat the cyanide containing waste waters of the metal plating and finishing industry came to be the most widely used cyanide destruction process (Huiatt, J. L., Kerrigan, J. E., Olson, F. A. and Potter, G. L. (editorial committee) Cyanide from Mineral Processing, *Proceedings of a Workshop*, Salt Lake City Utah, 1982). The destruction of cyanide by alkaline chlorination may be accomplished by means of chlorine gas, calcium hypochlorite, or sodium hypochlorite.

In the ozonation process, ozone is generated electrically, either from air or from oxygen. Use of oxygen yields twice the ozone concentration at half the power, and there may be some oxidation contribution from the oxygen itself. Hydrogen cyanide, cyanide ion, the complexes of zinc, cadmium

TABLE 1

Relative Stabilities of Cyanide Complexes in Water

| Total Cyanide | Free Cyanide | $CN^-$, HCN | |
|---|---|---|---|
| | WAD Cyanide | Readily Soluble | NaCN, KCN, $Ca(CN)_2$, $Hg(CN)_2$ |
| | | Relatively Insoluble | $Zn(CN)_2$, CuCN, $Ni(CN)_2$, AgCN |
| | | Weak Complexes | $Zn(CN)_4^{2-}$, $Cd(CN)_3^{2-}$, $Cd(CN)_4^{2-}$ |
| | | Moderately Strong Complexes | $Cu(CN)_2^{1-}$, $CuZn(CN)_3^{2-}$, $Ni(CN)_4^{2-}$, $Ag(CN)_2^{1-}$, $Sn(CN)_4^{2-}$, $Sn(CN)_3^{2-}$ |
| | Strong Complexes | | $Fe(CN)_6^{4-}$, $Co(CN)_6^{4-}$, $Au(CN)_2^{1-}$, $Fe(CN)_6^{3-}$, $Hg(CN)_4^{2-}$ |

Smith & Mudder 1991 and (Smith, A. Attenuation and Migration of Cyanide in the Environment, 1988) describe the Eh-pH diagram for the $CN$—$H_2O$ system.

The thermodynamics of the cyanide-cyanate reaction indicates that cyanate should be the predominant species under natural conditions. However, it has been found difficult to oxidize cyanide to cyanate under natural ambient conditions. A strong oxidant such as ozone, hydrogen peroxide, or chlorine is reported to be required to derive this reaction. Bacterial enzymes or catalytic surfaces of titanium dioxide, zinc sulfide and carbon have been reported to promote this oxidation as well.

There are many ways used to destroy cyanides. Some are briefly described below. Natural degradation is a simple way of destroying cyanides. The mill effluent water or slurry is allowed to stand in the tailing pond for an extensively long period of time. A combination of processes viz., volatilization, hydrolysis, photodegradation, dissociation, chemical and bacterial oxidation, and precipitation occur and oxidize the cyanide to cyanate. The process is a low capital and low maintenance operation, free of any toxic by-product formation. If residence time restrictions and threat to wildlife exist, then this process may not be suitable despite being the most simple and cost effective. However, natural degradation can be effective as a pretreatment to and copper as well as thiocyanate are reportedly quickly and easily destroyed. (Huiatt, J. L., Kerrigan, J. E., Olson, F. A. and Potter, G. L. (editorial committee) Cyanide from Mineral Processing, *Proceedings of a Workshop*, Salt Lake City, Utah, 1982).

Cyanide destruction may also be achieved with hydrogen peroxide (Ahsan, M. Quamrul, PhD. 1990, Degussa Corp.). Copper has been reported to act as a catalyst in bringing about the oxidation of cyanide to cyanate in the presence of hydrogen peroxide.

The INCO process sparges the cyanide solution with $SO_2$ in an air stream. In the INCO process, two to five percent $SO_2$ is sparged into the solution containing at least 50 mg/L $Cu^{2+}$. The copper can either be from the Cu present in the waste stream, or added as copper sulfate. The $SO_2$ can be supplied as $SO_2$ or as soluble sulfite or meta-bisulfite salt. Ferricyanide, if present, is reduced to ferrocyanide and precipitated as an insoluble metal ferrocyanide, $M_2Fe(CN)_6$ where M can be Cu, Ni, or Zn.

The acidification/volatilization/reneutralization treatment has been researched extensively (Huiatt, J. L., Kerrigan, J. E., Olson, F. A. and Potter, G. L. (editorial committee) Cyanide from Mineral Processing, *Proceedings of a Workshop*, Salt Lake City, Utah, 1982). Hydrogen cyanide is extremely volatile, with a vapor pressure of 100 kPa at 26°

C. This phenomenon is utilized in the Mills-Crowe process for cyanide regeneration. The solution is acidified (0.50–1.0 g/l $H_2SO_4$ excess) and dropped through a grid-packed tower counter-current to an air stream. The air, which picks up the hydrogen cyanide formed by the acid from the cyanide ion and zinc, copper and nickel cyanide complexes, is swept into an absorber tower where it contacts a weak lime slurry dispersed as a mist. The absorber tower solution is recycled so as to build up useable levels of cyanide concentration for return to cyanidation. The acid treatment does not liberate cyanide from ferrocyanide or thiocyanate. A significant amount of solid, consisting of gypsum (from the neutralization of lime by sulfuric acid) and possibly some calcium carbonate from the CO in the air, will form in the depleted cyanide solution. Depending on the composition of the barren feed and the final pH of the treated solution, cuprous cyanide and thiocyanate, and zinc, copper, nickel and iron may also be present in solution. In addition the solution is, of course, acid. It is therefore necessary to neutralize and filter the stripped, treated barren solution before discharging it as effluent.

Adsorption can be achieved by the following processes: Ion Exchange; Activated Carbon; Ion Flotation; and Precipitation Flotation.

The ion exchange process for cyanide recovery originated in 1956. Its development was prompted as much by concern for recovery of water in a relatively arid region as by loss of cyanide. The system consists of a lead column of the anion exchange resin to adsorb cyanide complexes, followed by a column of the same resin conditioned by precipitation of cuprous cyanide in the resin matrix, to remove free cyanide. The process apparently operates at about pH 11. The indications are that all the metal complex cyanides are in fact readily adsorbed by anion exchange resins, and since there is often little or no uncomplexed cyanide ions in gold mill effluents, this is often not a matter for concern. Where this is not the case, a small amount of any of the metals (zinc, copper or ferrous ion) could be added. High thiocyanate concentrations can interfere with cyanide adsorption.

The use of activated carbon for cyanide removal dates back some 14 years and apparently stems from attempts to employ it as a catalyst for the oxidation of cyanide. It was found that cyanide was first adsorbed, then catalytically oxidized. The presence of cupric ions results in the formation of copper cyanides, which enhances the adsorption capacity of the carbon. This permits faster flow rates and adds to the catalytic action. The copper may be impregnated on the carbon or fed with the cyanide solution. Continuous copper feeding causes hydrolysis of cyanate to yield ammonia and carbon dioxide (Huiatt, J. L., Kerrigan, J. E., Olson, F. A. and Potter, G. L. (editorial committee) Cyanide from Mineral Processing, *Proceedings of a Workshop*, Salt Lake City, Utah, 1982). Battelle Institute investigated the removal of cyanide using granular activated carbon (20×50 mesh) without oxidation. They also found it necessary to add copper (or nickel), this time to ensure removal. The presence of dissolved oxygen thus becomes unnecessary but the bed must then be regenerated.

Ion flotation has been known for about 20 years. It resembles conventional froth flotation in that it employs a collector and similar equipment, and the substance to be separated is carried out of the aqueous medium as a froth of air bubbles. It differs from froth flotation in that the substance to be separated is not usually present initially as a solid. The collectors are ionizable surface-active organic compounds, cationic for the flotation of anions, anionic for the flotation of cations. Since cyanide and its metal complexes are anions, cationic collectors are required. These are usually organic amines similar to those used for liquid-liquid extraction. Thus the mechanism of collection is similar to that of solvent extraction.

Precipitation flotation differs from ion flotation in that a colloidal precipitate is first formed and then floated. A laboratory investigation reported that ferrocyanide and nickelo-cyanide could be floated effectively. Cuprocyanide has been reportedly successfully removed from a zinc concentrate thickener overflow on an industrial scale (2200 $m^3$/day) by a combination of ion precipitate and ultra-fine particle flotation, at the Kamioka mine in Japan.

Electrochemical methods for treatment of cyanide can be divided into three categories: Electroreduction; Electrooxidation; and Electrochlorination. With the electroreduction (cathodic) reaction, complex metal cyanide ions undergo reduction at the cathode to deposit or precipitate the metal, generating a corresponding amount of cyanide ion. Electroreduction permits recycling of the regenerated cyanide in the treated barren solution to cyanidation to the extent that the water balance will accommodate it. Electrooxidation (anodic) reactions have apparently not been established for treatment of cyanide. In electrochlorination, introduction of sodium chloride into the solution to be treated gives rise to active chlorine either at the electrode or in solution. These react with cyanides to form cyanates, and with thiocyanate to form cyanate and sulfate, as in conventional alkaline chlorination. Chloride ion is regenerated and is therefore again available for charge transfer. The electrolysis should be carried out at 40°–50° C. to minimize formation of chlorate at the expense of hypochlorite generation. As with conventional alkaline chlorination, pH control is important. The ability of electrooxidation and electrochlorination to reduce total cyanide concentration in the effluents to the proposed levels has not yet been demonstrated unequivocally. As far as is known, none of these electrochemical options results in elimination of ferrocyanide.

The addition of excess ferrous ions to solutions of free cyanide converts most of the cyanide to ferrocyanide at an alkaline pH of 10 or above. This is one of the oldest cyanide disposal methods (Goodwin, Ernest, "Process for the Removal of Cyanide and Other Impurities from Solution," U.S. Pat. No. 4,840,735, Jun. 20, 1989; Isamu, Kato, "Removal of Cyanides From Wastewaters by Controlled Addition of Ferrous Salts." Japanese Patent, patent number: 04 83,590, Mar. 17, 1992; Shutt, Thomas C., "Method for Detoxifying Cyanide-containing Water," U.S. Pat. No. 5,264,192, Nov. 23, 1993). The process reactions are as shown below:

Complexation of Free Cyanides ore:

$$6CN^- + 3Fe^{2+} \rightarrow Fe_2Fe(CN)_6$$

Other Complexation of Metal Cyanides ore:

$$3Cu(CN)_3^{2-} + 3Fe^{2+} \rightarrow 3CuCN + Fe_2Fe(CN)_6$$

$$3Zn(CN)_4^{2-} + 3Fe^{2+} \rightarrow 3Zn(CN)_2 + Fe_2Fe(CN)_6$$

Ferrocyanide is a very stable complex. It settles down at the bottom of the tailings pond and it is temporarily non-toxic. Presence of thiocyanates drastically hampers the complexation process and the removal is not achieved to an acceptable level. Recently it has been reported that the ferrocyanides decompose under sunlight yielding HCN and the stability of ferrocyanide is questionable.

Bio-degradation has been successfully applied at Homestake Mining's Lead, South Dakota using rotating biological contactors (Mudder, T. I. and Whitlock, J. L., 1983 "Biological Treatment of Cyanidation Wastewaters, *Paper in Proceedings of the 38th Industrial Wastes Conference*, Purdue University, 1983, pp 279–287; Whitlock, J. L. and Mudder, T. I., 1986, The Homestske Wastewater Treatment Process: Biological Removal of Toxic Parameters From Cyanidation Wastewaters and Bioassy Effluent Evaluation, *Chapter in Fundamental and Applied Biohydrometallurgy*, ed. by R. W. Lawrence, et al., Elsevier, 1986, pp. 327–339). It is well known that certain microorganisms, such as fungi and bacteria, can metabolize cyanide. *Bacilus megaterium* converts KCN to asparagine, aspartic acid and carbon dioxide. On the other hand, *Pseudomonas paucimobilis mudlock* oxidizes free and complexed cyanide to carbonate and ammonia. The U.S. Bureau of Mines at Salt Lake City has cultured a different strain of bacteria *Pseudomonas pseudoalcaligenes* from a tailing pond water, which is reportedly capable of oxidizing cyanide better than Pseudomonas paucimobilis mudlock. Various biological processes such as trickling filters, activated sludge, fluidized bed reactors and rotating biological contactors (RBC's) have been studied for their suitability for application to cyanide decomposition.

There is a continuing need for a process that renders a cyanide or cyanide compound substantially insoluble in cyanide-containing materials.

SUMMARY OF THE INVENTION

A method for rendering a cyanide-containing compound substantially insoluble in an aqueous solution or suspension of cyanide-containing materials or a solid cyanide-containing material comprising: mixing a reagent comprising a thiosulfate salt with said solution or suspension; and adding to said material a complexing agent selected from the group consisting of divalent copper salts, divalent iron salts, divalent cobalt salts, activated carbon, and mixtures of the foregoing is provided. Preferred complexing agents are: copper sulfate, ferrous sulfate, cobalt sulfate, activated carbon, and mixtures of the foregoing. The thiosulfate salt is preferably selected from the group consisting of ammonium thiosulfate, sodium thiosulfate, potassium thiosulfate and mixtures of the foregoing.

The method may further comprise separating solids containing substantially insoluble cyanide-containing material from liquids.

This invention provides methods for the detoxification of cyanide. By "detoxification" is meant oxidation thereof or rendering it substantially insoluble by forming strong complexes with other ions. These complexes are even stronger and less soluble than the "strong complexes" currently known to the art, i.e. $Fe(CN)_6^{4-}$, $Co(CN)_6^{4-}$, and $Au(CN)^{2-}$. The material to be treated by the cyanide detoxification process of this invention includes free cyanide, weak acid dissociate (WAD) cyanide, including readily soluble salts and relatively insoluble salts of cyanide, weak complexes, moderately strong complexes and strong complexes.

A preferred embodiment of the method comprises mixing a reagent comprising a thiosulfate such as ammonium thiosulfate, sodium thiosulfate, potassium thiosulfate, any copper thiosulfate and mixtures thereof, with an aqueous solution or suspension of cyanide-containing materials. At least stoichiometric amounts of thiosulfate based on the amount of cyanide in the solution or suspension is preferably used, preferably at least about two to one hundred (ppm) times the cyanide (ppm) present in the solution and in the slurry or sludge. Greater or lower amounts of thiosulfate may be used, as long as the desired amount of cyanide detoxification occurs. This may be achieved by changing other experimental parameters, as known in the art using the teachings described here.

To this mixture is added a complexing agent selected from the group consisting of divalent copper salts, divalent iron salts, divalent cobalt salts, activated carbon, and mixtures thereof. At least stoichiometric amounts of the salts based on the amount of cyanide in the solution or suspension is preferably used, preferably at least about one to about fifty (ppm) times more than the cyanide (ppm) present in the solution and in the slurry or sludge. The salts may be any readily available salts including as anions, sulfate, chloride, nitrate and metallic salts. Greater or lesser amounts of complexing agent may be used, as long as the desired amount of cyanide detoxification occurs.

Also provided is a composition comprising: between about 10 and 2000 ppm of a thiosulfate salt; and between about 1 and 1000 ppm of a complexing agent selected from the group consisting of divalent copper salts, divalent iron salts, divalent cobalt salts, activated carbon, and mixtures of the foregoing.

Activated carbon may be of any readily-available commercial particle size and grade, e.g. smaller than about 4 mesh, and preferably between about 4 and about 100 mesh. Sufficient activated carbon should be used to adsorb all the cyanide ions present. A weight ratio of activated carbon to cyanide in solution between about I and about 10 is preferred.

The pH of the reaction mixture will typically be the pH of solutions or suspensions produced as intermediate or product streams of gold recovery processes. The pH should preferably be maintained between about 5 and about 11 and all intermediate ranges therein, such as by the addition of acids or bases such as NaOH, CaO or $Ca(OH)_2$ as and if required. The pH of the reaction mixture is most preferably maintained to between about 8 and 10 during the reactions of the methods of the invention, and all intermediate ranges therein, by means known in the art.

The Eh of the solution can be adjusted to between about 0.2 and 0.8V, and all intermediate ranges therein, using bleach/oxygen/$H_2O_2$ or other methods known in the art.

The reactions may be carried out for any time sufficient to cause the desired detoxification of cyanide. If a sequence of reagents is used, the reaction times with each reagent do not need to be the same. Preferably, the sample is allowed to contact the thiosulfate for between about 5 and 50 minutes, and the sample is allowed to contact the complexing agent for between about 2 and 20 minutes.

The reaction may be carried on at temperatures between about 10 and about 50° C., preferably between about 20° C. and about 25° C.

The cyanide-containing materials to which this process may be applied may be cyanide solutions, sludges, or dry materials such as dried sludges. Sample preparation methods are known in the art, described herein, or readily determinable by one of ordinary skill in the art using methods known in the art or described herein. For example, when dried materials are treated, sufficient water must be added to form a medium in which the cyanide insolubilization reactions can take place. Preferably a volume ratio of water to dry material of at least about 1 is used.

DETAILED DESCRIPTION OF THE INVENTION

Initial Sample Characterization

Hecla Samples

Figure 1:
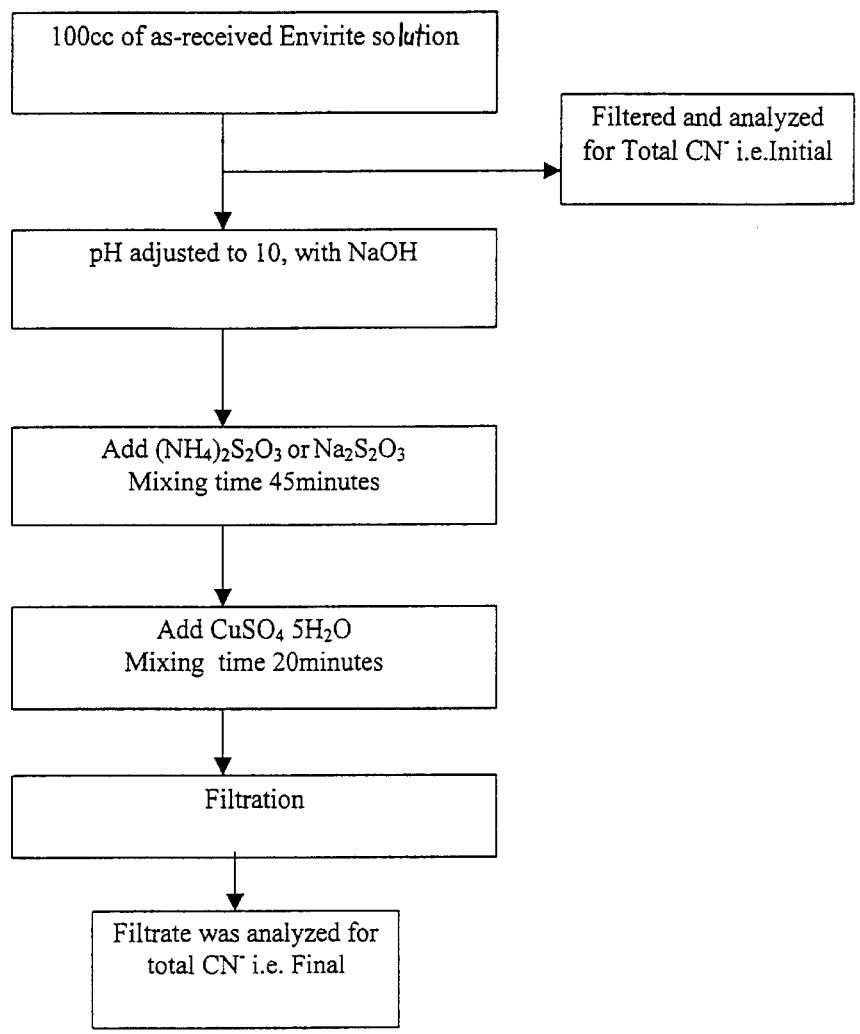
FIG. 1 is a flow chart which illustrates example procedures for cyanide detoxification in solution.

Two samples from the Hecla Mining Company (Idaho) were used for detoxification tests:

Sample 1. Cyanide Pond Water

Sample 2. Sludge Sample (water+solids)

Analyses of both of the samples are given in Table 2.

TABLE 2

Analysis of As-received Hecla Samples

| Sample ID | pH | $WAD_{CN}$ (ppm) | Total CN (ppm) | Cu (ppm) | Ag (ppm) | Hg (ppm) |
| --- | --- | --- | --- | --- | --- | --- |
| Sample 1 Pond Water | 8.08 | 1.34 | 3.30 | 0.02 | 0.08 | <0.250 |
| Sample 2 Sludge (Water + Solid) | 8.36 | 0.025 | 1.60 | 10.1 | 1.86 | <0.250 |
| Filtrate from Sludge | 8.30 | 0.005 | 0.054 | 0.03 | 0.03 | <0.250 |

Envirite Solution

Cyanide containing wastes received from ENVIRITE of Ohio, was also tested. The elemental composition of the as-received solution as determined by ICP is given in Table 3. The analysis was conducted by a private, bonded laboratory (Col-Tech Lab in Reno, Nev.). The Eh, pH and total cyanide present in the solution is also given in Table 3.

TABLE 3

Elemental Analysis pH, Eh and Total Cyanide Concentration of ENVIRITE Solution

| Element | (ppm) | Element | (ppm) |
| --- | --- | --- | --- |
| Aluminum | <5.00 | Manganese | <0.50 |
| Antimony | 3.26 | Mercury | <2.00 |
| Arsenic | <4.00 | Molybdenum | <2.00 |
| Barium | <2.00 | Nickel | <1.00 |
| Beryllium | <0.05 | Phosphorous | 159 |
| Bismuth | <0.05 | Potassium | 4190 |
| Cadmium | <0.10 | Scandium | <2.00 |
| Calcium | <2.00 | Selenium | <2.00 |
| Chromium | <0.50 | Silver | <0.50 |
| Cobalt | <0.10 | Sodium | 40200 |
| Copper | <0.10 | Strontium | <2.00 |
| Gallium | <0.50 | Thallium | <2.00 |
| Iron | 54.2 | Tin | 1442 |
| Lead | <0.25 | Titanium | <2.00 |
| Lithium | <0.50 | Vanadium | <2.00 |
| Magnesium | <0.50 | Zinc | <2.00 | pH = 8.08 Eh = 100 mV Total $CN^-$ = 182 ppm

As can be seen, the solution contains an appreciable amount of sodium and potassium. The concentration of heavy metals is very low with an exception of Sn (1442 ppm). The total cyanide concentration is around 182 ppm. It is believed that most of the cyanide is complexed with Sn and not with Fe. The presence of free cyanide is extremely low.

Envirite Sludge Sample

A blue, dry cake (about 8 lbs) was received from Envirite. Preliminary analysis of the as-received sludge is given in Table 4.

TABLE 4

Sludge Characterization

| | |
| --- | --- |
| Physical State: | Dry Solid |
| Color: | Prussian Blue |
| Texture: | Powder |
| pH (30% solution): | 5.04 |
| Cyanide (in solution): | 588 ppm |

Analytical Procedures

The cyanide concentration of some of the synthetic solutions was determined using the silver nitrate titration method for free cyanide at levels of above 10–20 ppm. The method involves titrating a known volume of sample with a standard silver nitrate solution, forming cyanide in the process. The end point (excess silver nitrate when all the free cyanide has reacted) is estimated using a dimethylaminobenzalrhodamine indicator (Standard Methods For The Examination of Water and Wastewater, $17^{th}$ Edition, APHA-AWWA-WPCF, 1989). Independent analyses were conducted by Coltech laboratory and Bio-Quest Inc.

Filtrate Analysis

Cyanide detection was accomplished using a segmented flow injection system developed and sold by ALPKEM, O.I. Analytical, at Col Tech Environmental Labs., Reno. A 200 $\mu$l aliquot of the pre-treated sample is injected into the flow injection manifold of the system which includes two UV digesters. Addition of acid converts cyanide ion to hydrogen cyanide gas (HCN) that passes under a gas diffusion membrane. The HCN diffuses through the membrane into an alkaline receiving solution where it is converted back to cyanide ion. The cyanide ion is monitored amperometrically with a silver working electrode. The current generated is proportional to the cyanide concentration present in the original sample.

Experimental Procedure and Results

Synthetic Solution

Reagents used, with the exception of lanthanum chloride, were all reagent-grade chemicals. Lanthanum chloride was commercial grade (50% purity). Bulk synthetic solutions were prepared from their respective salts. Both potassium ferricyanide and sodium cyanide solutions were tested. 100 ppm cyanide stock solutions were prepared. The pH was adjusted to 10 using NaOH. The pH was also monitored at intervals and was maintained at 10 with NaOH. 100 ml of 100 ppm $K_3Fe(CN)_6$ or NaCN stock solutions was used for analysis and testing. To this solution thiosulfate (in various forms as described in the results) and complexing agent were added sequentially. Thiosulfate was added first followed by complexing agent.

The system was stirred continuously with a magnetic stirrer, at room temperature. The reaction was carried out for 45 minutes after thiosulfate addition, it was maintained for another 10 minutes after complexing agent addition. The fine precipitate was filtered using 0.45 micrometer filter paper. The filtrate was preserved at a cooler temperature in the refrigerator until it was analyzed for total cyanide.

Results are given in Tables 5 and 6 for potassium ferricyanide solutions. Analytical work for total cyanide was performed by Col Tech Environment Lab. Results using sodium cyanide synthetic solution are listed in Table 7.

TABLE 5

Detoxification of Potassium Ferricyanide in the presence of thiosulfate and copper Solution volume: 100 cc; pH = 10; Initial CN$^-$ = 100 ppm

| Reagent | Total Cyanide Conc. After Treatment, ppm | Removal Efficiency, % |
|---|---|---|
| Ferricyanide 100 ppm + 300 mg $(NH_4)_2S_2O_3$ + 80 mg $CuSO_4$ $5H_2O$ | 6.33 | 93.67 |
| Ferricyanide 100 ppm + 300 mg $(NH_4)_2S_2O_3$ + 160 mg $FeSO_4 \cdot 7H_2O$ + 80 mg $CuSO_4$ $5H_2O$ | 2.62 | 97.38 |
| Ferricyanide 100 ppm + 300 mg $Na_2S_2O_3$ + 80 mg $CuSO_4$ $5H_2O$ | 6.41 | 93.51 |
| Ferricyanide 100 ppm + 300 mg $Na_2S_2O_3$ + 160 mg $FeSO_4 \cdot 7H_2O$ + 80 mg $CuSO_4$ $5H_2O$ | 1.45 | 98.55 |

TABLE 6

Detoxification of Potassium Ferricyanide at different dosages of Sodium Thiosulfate and Activated Carbon Solution volume: 100 cc; pH = 10; Initial CN$^-$ = 100 ppm

| Reagent | Total Cyanide Conc. After Treatment, ppm | Removal Efficiency, % |
|---|---|---|
| Ferricyanide 100 ppm + 20 mg $Na_2S_2O_3$ + 50 mg Activated Carbon | 0.85 | 99.15 |
| Ferricyanide 100 ppm + 40 mg $Na_2S_2O_3$ + 50 mg Activated Carbon | 0.02 | 99.98 |
| Ferricyanide 100 ppm + 80 mg $Na_2S_2O_3$ + 50 mg Activated Carbon | 0.02 | 99.98 |
| Ferricyanide 100 ppm + 120 mg $Na_2S_2O_3$ + 50 mg Activated Carbon | 0.28 | 99.72 |
| Ferricyanide 100 ppm + 240 mg $Na_2S_2O_3$ + 50 mg Activated Carbon | 1.71 | 98.29 |
| Ferricyanide 100 ppm + 100 mg $Na_2S_2O_3$ | 99.7 | 0.3 |
| Ferricyanide 100 ppm + 50 mg Activated Carbon | 92.9 | 7.1 |

From the results in Table 6, it is seen that thiosulfates are very effective in cyanide detoxification in the presence of activated carbon.

TABLE 7

Cyanide Detoxification tests with free cyanide (Sodium Cyanide) Solution volume 100 cc; pH = 10; Initial CN$^-$ = 100 ppm

| Reagent | Total Cyanide Conc. After Treatment, ppm | Removal Efficiency, % |
|---|---|---|
| Sodium Cyanide 100 ppm + 150 mg $Na_2S_2O_3$ + 100 mg $CuSO_4$ $5H_2O$ | 4.52 | 95.48 |
| Sodium Cyanide 100 ppm + 150 mg $(NH_4)_2S_2O_3$ + 100 mg $CuSO_4$ $5H_2O$ | 0.63 | 99.37 |

TABLE 7-continued

Cyanide Detoxification tests with free cyanide (Sodium Cyanide) Solution volume 100 cc; pH = 10; Initial CN$^-$ = 100 ppm

| Reagent | Total Cyanide Conc. After Treatment, ppm | Removal Efficiency, % |
|---|---|---|
| Sodium Cyanide 100 ppm + 100 mg $Na_2S_2O_3$ + 75 mg $CuSO_4$ $5H_2O$ | 3.97 | 96.03 |
| Sodium Cyanide 100 ppm + 400 mg $(NH_4)_2S_2O_3$ + 150 mg $CuSO_4$ $5H_2O$ | 0.02 | 99.98 |

The test results show the effectiveness of both thiosulfates tested (ammonium and sodium). The test also confirm that the thiosulfate treatment is effective in treating both simple and complex cyanides.

Hecla Samples

A 100 ml sample was used in most of the tests. pH was adjusted with NaOH. Preliminary tests were performed with both pond water and the sludge to determine the effectiveness of thiosulfate treatment.

The samples were stirred with a magnetic stirrer, at room temperature. Unless otherwise specified, the reaction time after thiosulfate addition was 45 minutes, it was maintained for another 10 minutes after complexing agent addition. The fine precipitate was filtered using 0.45 micrometer filter paper. The filtrate was preserved at a cooler temperature until it was analyzed for Total and WAD cyanide.

The effect of pH was also studied. Tests were performed with the as-received sample and after pH adjustment. The effect that mixing time has on the results was also monitored. The effect of using solid vs. liquid reagent was also tested. Both thiosulfate and copper sulfate liquid were added at different dosages. Since the concentration of other heavy metals in mining discharge is regulated, the concentration of selected metals before and after cyanide removal was also tested.

Cyanide Detoxification of Hecla Pond Water

The pH of both samples received was less than 10, indicating some loss of cyanide during transit. The WAD and total cyanide in the pond water was greater than that of sludge. The copper content in the sludge was 10.1 ppm as compared to 0.02 ppm in the pond water. Sample testing was performed using the procedures outlined above.

TABLE 8

Results of Preliminary Tests with Hecla samples Solution volume: 100 cc; pH = 8 (as received); Initial Total CN$^-$ of Pond Water = 3.30 ppm; WAD cyanide 1.34 ppm

| Sample ID | Reagents | WAD$_{CN}$ (ppm) | Total CN, (ppm) |
|---|---|---|---|
| Pond Water | 220 mg $(NH_4)_2S_2O_3$ + 100 mg $CuSO_4.5H_2O$ | 0.004<br>0.006 (duplicate) | 0.450<br>0.114 (duplicate) |
| Sludge | 220 mg $(NH_4)_2S_2O_3$ + 100 mg $CuSO_4.5H_2O$ | 0.118 | 0.020 |

As can be seen, the WAD cyanide concentration decreased from 1.34 ppm to 0.004 ppm, and total cyanide reduced from 3.30 ppm to 0.450 ppm. This preliminary test showed that thiosulfate treatment can be used to remove cyanide from the tailings pond water sample. In the case of the sludge sample, the process was effective in reducing total cyanide from 1.60 ppm to 0.020 ppm.

Experiment Without Copper Sulfate

In order to test the hypothesis that WAD and total cyanide can be reduced without copper sulfate, one experiment was conducted without any copper sulfate addition (see Table 9).

TABLE 9

Volume = 100 cc; pH = 9.30; Mixing time = 40 minutes

| Reagent Addition | $WAD_{CN}$ (ppm) | Total CN (ppm) |
|---|---|---|
| $(NH_4)_2S_2O_3$: 20 mg. + $CuSO_4 \cdot 5H_2O$: None | 0.096 | 5.27 |

$WAD_{CN}$ can be reduced without copper sulfate addition but not the total cyanide.

In order to evaluate the effect of pH, another series of experiments was performed at pH 11.0 using a different sample. Results are given in Table 10.

TABLE 10

Solution volume: 100 cc; pH = 8 (as received), Initial $WAD_{CN}$ = 2.72 ppm; Initial Total CN = 7.48 ppm

| Exper. No. | $(NH_4)_2S_2O_3$, mg. | $CuSO_4 \cdot 5H_2O$, mg. | pH | $WAD_{CN}$, ppm | Total CN, ppm |
|---|---|---|---|---|---|
| 1 | 10 | 11.36 | 11.7 | 2.24 | 4.94 |
| 2 | 10 | 11.36 | 11.7 | 2.24 | 5.81 |
| 3 | 10 | 11.36 | 11.7 | 2.31 | 4.50 |
| 4 | 20 | 15 | 11.7 | 2.27 | 7.92 |
| 5 | 10 | 10 | 11.9 | 2.37 | 7.06 |
| 6 | 10 | 11.36 | 9.0 | 0.023 | 0.131 |

At pH above 11.0, there is little reduction in $WAD_{CN}$. By lowering the pH to 9.0 at the same level of reagent addition, WAD cyanide and total cyanide concentration can be reduced to 0.023 ppm and 0.136 ppm, respectively.

Effect of Mixing Time

To study the effect of mixing time, the time after $(NH_4)_2S_2O_3$ was added was decreased from 40 minutes to 15 minutes, and the time after $CuSO_4 \cdot 5H_2O$ was added was reduced from 15 minutes to 5 minutes. It was noticed that by decreasing the mixing time, the concentration of both WAD and total cyanide did not reduce to the desired level (see Table 11).

TABLE 11

Effect of Mixing Time
Solution volume = 100 cc; pH = 9–10; Initial Total CN⁻ = 3.30 ppm; WAD cyanide 1.34 ppm; $(NH_4)_2S_2O_3$ = 10 mg.; $CuSO_4 \cdot 5H_2O$ = 5 mg.

| Time, Minutes | $WAD_{CN}$, ppm | Total CN, ppm |
|---|---|---|
| 40 + 15 | 0.004 | 0.92 |
| 15 + 5 | 1.74 | 4.76 |

Results confirm that reaction time is important for the detoxification process. A reaction time of 45 minutes after thiosulfate addition and 15 minutes after copper addition is the presently preferred condition.

Solid vs. Liquid Addition

The ammonium thiosulfate is available either in the solid or liquid form. It is easier to add a liquid sample (obtained from Cherokee) than a solid one. One experiment was conducted using liquid ammonium thiosulfate and results were compared to solid addition. It was observed that liquid is more effective at a lower dosage than a solid sample. This is most likely due to good mixing when thiosulfate is used in liquid form. The results are presented in Table 12.

TABLE 12

Solution volume: 100 cc; pH = 8 (as received); Initial Total CN⁻ = 3.30 ppm; WAD cyanide 1.34 ppm

| Reagents | Type | $WAD_{CN}$ (ppm) | Total CN (ppm) |
|---|---|---|---|
| 10 mg $(NH_4)_2S_2O_3$ + 5 mg $CuSO_4 \cdot 5H_2O$ | Solid | 0.005 | 0.28 |
| 6 mg. $(NH_4)_2S_2O_3$ + 3 mg $CuSO_4 \cdot 5H_2O$ | Liquid | 0.004 | 0.83 |

If liquid $(NH_4)_2S_2O_3$ is added, then the concentrations of $(NH_4)_2S_2O_3$ and $CuSO_4 \cdot 5H_2O$ preferred for 1000 liters of pond water are 0.06 kg and 0.03 kg.

Metals Content

The concentrations of selected, dissolved metals before and after cyanide removal is given in Table 13.

TABLE 13

Concentration of Dissolved Metals, ppm

| | Before | | | | After | | | |
|---|---|---|---|---|---|---|---|---|
| Sample ID | Cu | Ag | Hg | Zn | Cu | Ag | Hg | Zn |
| Tailings Pond Water | 0.02 | 0.08 | <0.250 | — | 2.96 | 0.08 | <0.025 | 10.050 |
| Sludge (water + solid) | 10.1 | 1.86 | <0.025 | — | — | — | — | — |

Only the concentration of Cu has increased from 0.02 to 2.96 ppm. Copper can be reduced to the regulatory limit by the addition of potassium dithiocarbamate. It is recommended that the copper removal, if performed, be performed after cyanide removal.

Envirite Samples

Solution 100 ml of the solution was used in most of the tests. The pH and Eh were adjusted in some of the tests. The pH adjustment in most cases was done with sodium hydroxide, while in others calcium hydroxide was used. Bleach/$H_2O_2$ was used to adjust the Eh. 50% strength $H_2O_2$ was used in the tests. Tests with conventional oxidants were performed.

The reaction times of thiosulfate and copper sulfate were similar to the previous tests (i.e. 45 minutes after thiosulfate addition and 10 minutes after copper sulfate addition). The dosage of thiosulfate and complexing agent were varied to optimize the conditions. The reaction for liquid samples was carried out using the procedure outlined in FIG. 1.

The reactions were carried out with continuous stirring on a magnetic stirrer or water bath and at room temperature. The fine precipitate was filtered using 0.45 micrometer filter paper. The precipitate was analyzed for total cyanide. The effect of Ferrous Sulfate and Lanthanum Chloride were also tested. Both were tested individually.

Test with Sludge Sample

Figure 2:
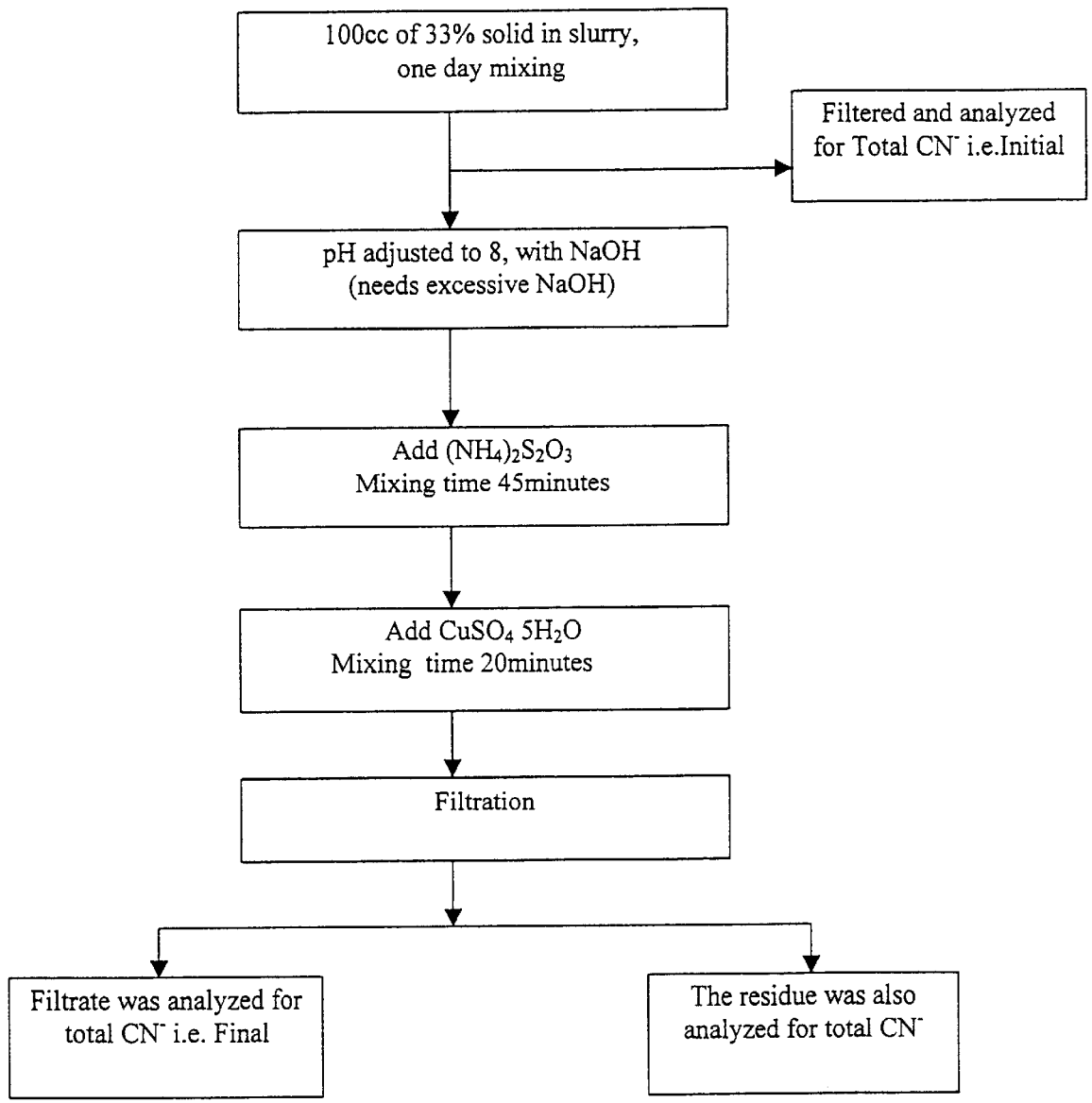
FIG. 2 is a flow chart which illustrates example procedures for cyanide detoxification in slurry.

As-received dry sludge was mixed in water and tests were performed using the flowsheet as shown in FIG. 2. 100 ml of the solution were used in most of the tests. The pH was adjusted in some of the tests using sodium hydroxide. Experiments were carried out with similar reaction times for thiosulfate and complexing agent as in the previous tests. The dosage of thiosulfate and complexing agent were varied to optimize the conditions.

Figure 3:
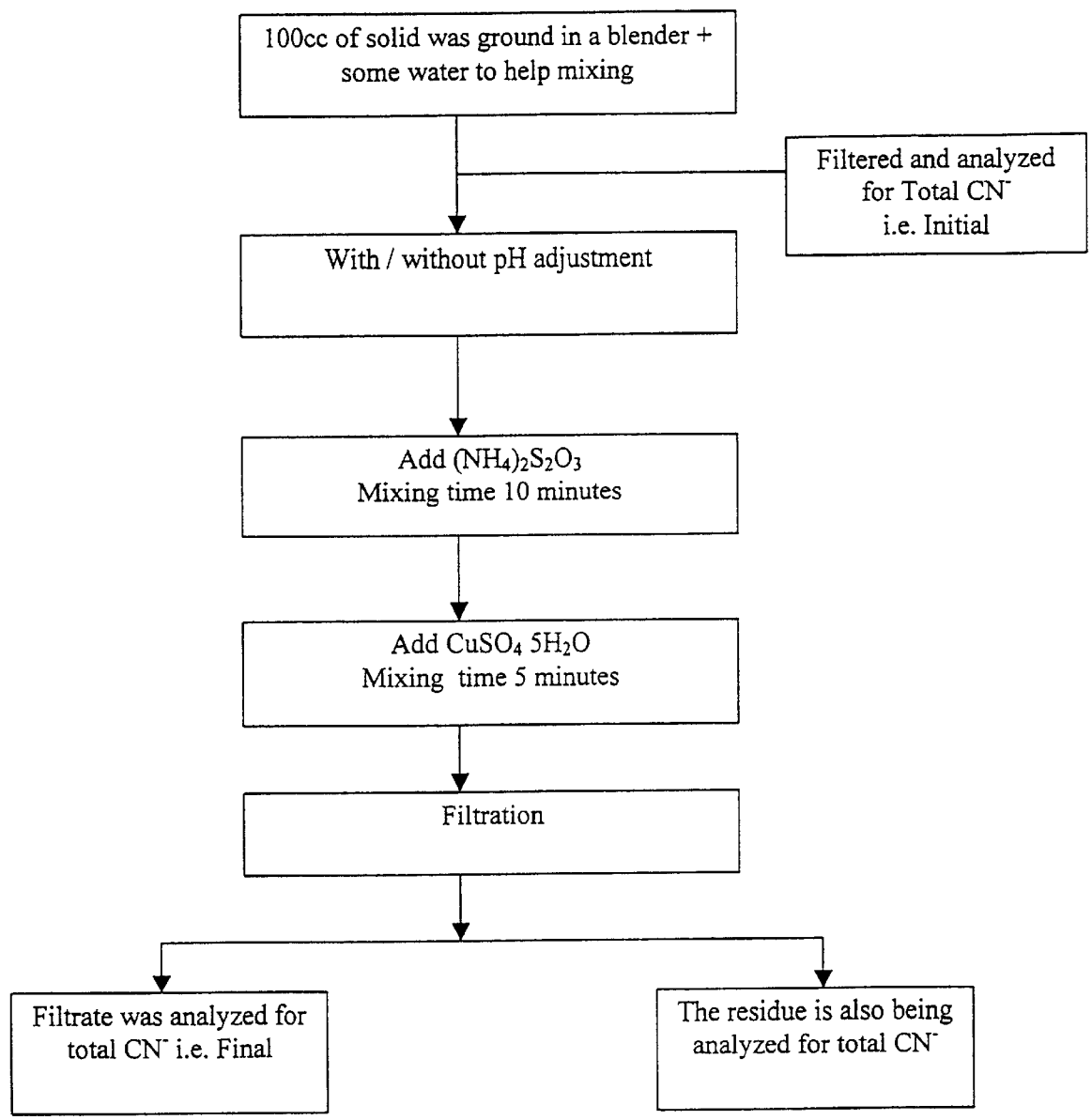
FIG. 3 is a flow chart which illustrates example procedures for cyanide detoxification in a solid sample.

In another set of experiments 100 gm of dry sludge was mixed in a blender and tests were conducted using the example procedures outlined in FIG. 3. Another series of tests were conducted without adjusting the pH.

Tests with Conventional Oxidants for Envirite Solution

TABLE 14

Cyanide removal using conventional oxidants, with and without a small amount of catalyst
Solution volume: 100 cc; pH = 10; Initial Total CN⁻ = 182 ppm

| Reagent | Total Cyanide Conc. After Treatment | Removal Efficiency, % |
|---|---|---|
| Activated Carbon 1 gm/100 cc | 154 | 15.4 |
| 4 cc of $H_2O_2$(50% strength) | 151 | 16.8 |
| $H_2O_2$ 6 cc 300 mg $Cu^{+2}$ | 127 | 30.2 |
| 4 cc of $H_2O_2$(50% strength) 250 gm $FeSO_4 \cdot 7H_2O$ | 152 | 16.4 |
| Bleach 450 mV | 141 | 22.5 |

As can be seen from the above results, cyanide removal using conventional oxidants with and without a small amount of catalyst is not particularly effective.

Precipitation Using $Fe^{+2}$ and Oxidants

The objective of these experiments was to co-precipitate metal-cyano complexes with $Fe^{+2}$ alone or in conjuction with some oxidants. All the tests were conducted at pH 10 where the co-precipitation with iron is very effective. Results are given in Table 15.

TABLE 15

Removal of Cyanide with Iron & Lanthanum
Solution volume: 100 cc; pH = 10; Initial Total CN⁻ = 182 ppm

| Reagent | Total Cyanide Conc. After Treatment | Removal Efficiency, % |
|---|---|---|
| 250 mg $FeSO_4 \cdot 7H_2O$ | 153 | 15.9 |
| 1 gm $FeSO_4 \cdot 7H_2O$ | 121 | 33.5 |
| 2 gm $FeSO_4 \cdot 7H_2O$ | 8.6 | 95.27 |
| 2.5 gm $FeSO_4 \cdot 7H_2O$ | 1.94 | 98.93 |
| 250 mg $FeSO_4 \cdot 7H_2O$ + 4 cc of $H_2O_2$(50% strength) | 150 | 17.5 |
| 250 mg $FeSO_4 \cdot 7H_2O$ + 7 cc of $H_2O_2$(50% strength) Eh 400 mV | 117 | 35.71 |
| 2.5 gm $FeSO_4 \cdot 7H_2O$ + Bleach (400 mV) | 1.14 | 99.3 |
| 1 gm $LaCl_3$ | 140 | 23.0 |

As can be noticed from Table 15, cyanide concentration can be reduced below 10 ppm by the addition of a high amount of ferrous sulfate. This shows that some of the cyanide is precipitating as potassium ferrocyanide and the stable complexes of cyanide are co-precipitating along with iron-oxyhydrites. Preliminary analysis showed a high amount of cyanide in the sludge which needs to be treated. The amount of ferrous required is around 20 lb. of $Fe^{+2}$/1 lb. of cyanide.

Present Invention with Envirite Sample

On the basis of the previous results obtained with Hecla samples, a series of experiments using thiosulfates (ammonium or sodium) to destroy cyanide in the presence of catalysts such as $Cu^{+2}$ and/or $Fe^{+2}$ were performed using the Envirite sample. Results are given in Table 16.

TABLE 16

Cyanide Removal Using Sodium and Ammonium Thiosulfate
Solution volume: 100 cc; pH = 10; Initial Total CN⁻ = 182 ppm

| Reagent | Total Cyanide Conc. After Treatment, ppm | Removal Efficiency, % |
|---|---|---|
| 300 mg $(NH_4)_2S_2O_3$ | 170 | 6.54 |
| 300 mg $(NH_4)_2S_2O_3$ + 150 mg $CuSO_4$ | 1.70 | 99.06 |
| 300 mg $(NH_4)_2S_2O_3$ + 100 mg $CuSO_4$ | 12.60 | 93.07 |
| 300 mg $Na_2S_2O_3$ | 175 | 3.8 |
| 300 mg $Na_2S_2O_3$ + 150 mg $CuSO_4$ | 3.14 | 98.27 |
| 300 mg $Na_2S_2O_3$ + 100 mg $CuSO_4$ | 4.64 | 97.45 |
| 300 mg $(NH_4)_2S_2O_3$ + 100 mg $CuSO_4$ + 600 mg $FeSO_4 \cdot 7H_2O$ | 0.43 | 99.7 |

Test Results with Dry Envirite Sludge

As-received dry sludge was mixed in water and tests were performed. Three different experiments were conducted using the general procedure in FIG. 3. Results are given in Table 17.

TABLE 17

Cyanide Detoxification in the Sludge
Solution volume: 100 cc; pH = 8.5; Initial Total CN⁻ = 588 ppm

| Reagent | Final Cyanide in Solution ppm | Removal Efficiency, % |
|---|---|---|
| 300 mg $(NH_4)_2S_2O_3$ + 150 mg $CuSo_4 \cdot 5H_2O$ | 3.86 | 99.34 |
| 600 mg $(NH_4)_2S_2O_3$ + 300 mg $CuSo_4 \cdot 5H_2O$ | 2.37 | 99.59 |
| 1000 mg $(NH_4)_2S_2O_3$ + 500 mg $CuSo_4 \cdot 5H_2O$ | 2.28 | 99.61 |

As can be seen from Table 17, 600 mg of $(NH_4)_2S_2O_3$+ 300 mg $CuSo_4 \cdot 5H_2O$ reduced the cyanide concentration in the total filtrate to 2.37. Increase in reagent addition did not decrease the cyanide concentration in the solution phase.

100 gm of dry sludge was mixed in a blender and tests were conducted using the procedure outlined in FIG. 3. Experiments were conducted without adjusting the pH, and also at alkaline pH, using sodium hydroxide. Results showed that cyanide can be stabilized in the sludge at pH 5.7 using ammonium thiosulfate and copper sulfate. Results are given in Table 18.

TABLE 18

Cyanide Detoxification in the Sludge
Solution volume: 100 cc; pH = 5.7 (as-received); Initial Total CN⁻ = 588 ppm

| pH | Reagent | Total Cyanide in Solution mg/l |
|---|---|---|
| 5.7 (original) | 1.5 g $(NH_4)_2S_2O_3$ + 700 mg $CuSO_4$ $5H_2O$ | 0.51 |
| 8.3 | No reagents | 2250 |

It can be seen from Table 18 that 1.5 g of $(NH_4)_2S_2O_3$+ 700 mg $CuSO_4$ $5H_2O$ reduce the soluble cyanide concentration in the filtrate from 2250 ppm to 0.51 ppm. Another series of experiments were conducted using ferrous sulfate. See Table 19.

TABLE 19

Cyanide Detoxification in the Sludge Using Ferrous Sulfate
Solution volume: 100 cc; pH = 5.7 (as-received); Initial Total CN⁻ = 588 ppm

| pH adjusted with NaOH | Reagent | Total Cyanide in Solution mg/l |
|---|---|---|
| 8.1 | No reagents | 316 |
| 8.1 | 750 mg $(NH_4)_2S_2O_3$ | 316 |
| 8.1 | 750 mg $(NH_4)_2S_2O_3$ + 700 mg $FeSO_4.5H_2O$ | 42.7 |

Test using a synthetic cyanide solution containing nickel cyanide

One liter of a cyanide solution containing 17 ppm nickel and 33.1 ppm total cyanide was also tested. Tests were conducted with the use of thiosulfate in conjunction with three selected activators. Results are given in Table 20.

TABLE 20

Cyanide Detoxification From Solution Containing Nickel Cyanide
Solution volume: 100 cc; Total cyanide: 33.1 ppm; Nickel cyanide = 17 ppm

| Reagent | pH | Total Cyanide Conc. After Treatment, ppm | CN⁻ Removal Efficiency, % | Final Ni, ppm |
|---|---|---|---|---|
| 50 mg $(NH_4)_2S_2O_3$ + 80 mg $FeSO_4.7H_2O$ | 10 | 18.5 | 44.1 | 16.2 |
| 50 mg $(NH_4)_2S_2O_3$ + 80 mg Activated Carbon | 10 | 10.5 | 68.2 | 10.06 |
| 100 mg $Na_2S_2O_3$ + 50 mg $CuSO_4$ | 10 | 8.0 | 75.5 | 0.062 |

As can be seen, thiosulfates are very effective in destroying cyanide and nickel cyanide in the presence of copper. In the presence of Cu, the nickel concentration is lower than 1 ppm.

Although the description above contains many specificities, these should not be construed as limiting the scope of the invention but as merely providing illustrations of some of the presently-preferred embodiments of this invention. For example, the Figures list many specific values for reaction times, sample amounts, etc. These are intended solely as examples and one of ordinary skill in the art would be able to modify the values and conditions without undue experimentation. Thus, the scope of the invention should be determined by the appended claims and their legal equivalents, rather than by the examples given. All references cited herein are hereby incorporated by reference to the extent not inconsistent with the disclosure herewith.

We claim:

1. A method for rendering a cyanide-containing compound substantially insoluble in an aqueous solution or suspension of cyanide-containing materials comprising:
  a) mixing a reagent comprising a thiosulfate salt with said solution or suspension; and
  b) adding to said material cobalt sulfate.

2. A method for rendering a cyanide-containing compound substantially insoluble in an aqueous solution or suspension of cyanide-containing materials comprising:
  a) mixing a reagent comprising a thiosulfate salt with said solution or suspension; and
  b) adding to said material activated carbon.

3. The method of claim 2, wherein said activated carbon is present in a weight of between about 1 to about 10 times the weight of cyanide present in said solution or suspension.

4. A method for destroying cyanide in a first cyanide-containing solution or suspension consisting essentially of: adding a reagent comprising a thiosulfate salt to said first solution or suspension to form a second solution or suspension; mixing said second solution or suspension for a time of about 5 to about 50 minutes; adding to said second solution or suspension a complexing agent selected from the group consisting of divalent copper salts, divalent iron salts, divalent cobalt salts, activated carbon, and mixtures of the foregoing to form a third solution or suspension; and mixing said third solution or suspension for a time of about 2 to about 20 minutes, whereby a portion of the cyanide in said first solution or suspension forms a precipitate.

5. A method for destroying cyanide in a first cyanide-containing solution or suspension consisting essentially of: adding a reagent comprising a thiosulfate salt to said first solution or suspension to form a second solution or suspension; mixing said second solution or suspension for a time of about 5 to about 50 minutes; adding to said second solution or suspension a complexing agent selected from the group consisting of divalent copper salts, divalent iron salts, divalent cobalt salts, activated carbon, and mixtures of the foregoing to form a third solution or suspension; and mixing said third solution or suspension for a time of about 2 to about 20 minutes, whereby a portion of the cyanide in said first solution or suspension forms a precipitate; and separating said precipitate from said third solution or suspension.

6. A method for rendering a cyanide-containing compound substantially insoluble in an aqueous solution or suspension of cyanide-containing materials comprising:
  a) first mixing a reagent comprising a thiosulfate salt with said solution or suspension, forming a first composition; and
  b) then adding to the first composition a complexing agent selected from the group consisting of divalent copper salts, divalent iron salts, divalent cobalt salts, activated carbon, and mixtures of the foregoing.

7. The method of claim 6 wherein said complexing agent is copper sulfate.

8. The method of claim 6 wherein said complexing agent is ferrous sulfate.

9. The method of claim 6 wherein the pH of said aqueous solution or suspension of cyanide-containing materials is adjusted to between about 5 and about 11.

10. The method of claim 6 wherein said cyanide-containing material contains dissolved cyanide.

11. The method of claim 6 wherein said cyanide-containing material is a sludge.

12. The method of claim 6 wherein said cyanide-containing material is a dry material and the method further comprises adding sufficient water to said material to provide a reaction medium.

13. The method of claim 12 wherein at least about an equal volume of water compared to the volume of dry material is added to said dry material.

14. The method of claim 6 further comprising separating solids containing substantially insoluble cyanide-containing compounds from the aqueous solution or suspension.

15. The method of claim 6 wherein said thiosulfate salt is selected from the group consisting of ammonium thiosulfate, sodium thiosulfate, potassium thiosulfate and mixtures of the foregoing.

16. The method of claim 6 wherein said thiosulfate salt is present in at least stoichiometric amounts based on the amount of cyanide in said solution or suspension.

17. The method of claim 6 wherein said complexing agent is a salt present in at least stoichiometric amounts based on the amount of cyanide in said solution or suspension.

* * * * *